United States Patent Office 2,866,832
Patented Dec. 30, 1958

2,866,832

PROCESS FOR THE DEHYDRATION OF DIMETHYLPHENYLCARBINOL

Maurice Fenoglio, Lyon, André Pacoud, St.-Fons, and Emmanuel Alvarado, Lyon, France, assignors to Societe des Usines Chimiques Rhone-Poulenc, Paris, France, a French body corporate No Drawing. Application December 17, 1956
Serial No. 628,578

Claims priority, application France July 13, 1954

9 Claims. (Cl. 260—669)

The present invention relates to the dehydration of dimethylphenylcarbinol to form α-methylstyrene and is especially, though not exclusively, concerned with a process for satisfactory effecting of such conversion in the presence of phenol. This application is a continuation-in-part of patent application Serial No. 520,153, filed July 5, 1955, now abandoned.

In the commercial scale manufacture of phenol, wherein cumene is oxidized to form its hydroperoxide and the cumene hydroperoxide obtained is decomposed into phenol and acetone by means of acid catalysts, a quantity of dimethylphenylcarbinol is obtained as by-product. This by-product can be utilized by dehydrating it into α-methylstyrene which, on hydrogenation, readily gives again the starting material of the process, that is, cumene.

The step of dehydration of the dimethylphenylcarbinol is effected by simple heating, but it is very slow. It is known to accelerate the dehydration step by means of catalysts such as sulphuric acid, potassium bisulphate, phosphoric acid or oxalic acid or substances offering a large surface such as infusorial earth, but the yields indicated in literature are not good. For example, when dimethylphenylcarbinol is heated on an oil bath with anhydrous or crystallized oxalic acid, only 55% of the theoretical yield of α-methylstyrene is obtained, the remainder being converted into unwanted polymer. These low yields are due to the fact that the catalysts in question produce at least a partial polymerization of the methylstyrene. When phosphoric acid is used, a dimer of the methylstyrene is almost exclusively obtained. The methylstyrene polymers formed can only be re-converted into monomer with difficulty; some are even entirely resistant to depolymerization, and their formation, therefore, represents a complication of the process and a reduction of the yield.

Furthermore, the known catalysts introduce another disadvantage when used for treating mixtures of dimethylphenylcarbinol and phenol, such mixtures are obtained in the decomposition of cumene hydroperoxide into phenol and acetone. It is, in fact, known that acid catalysts such as mineral acids or arylsulphonic acids promote reaction between phenol and the methylstyrene emanating from the dehydration of dimethylphenylcarbinol, which reaction yields a condensation product, cumylphenol, the re-utilization of which is also complicated.

It has been suggested in the literature to dehydrate dimethylphenylcarbinol by heating it with acetic anhydride but this method has the disadvantages of requiring large quantities of an expensive and troublesome reagent, acetic anhydride, as a prime reactant which is converted to a by-product having little value (acetic acid). Moreover, as acetic acid is relatively volatile, boiling at 116° C. at atmospheric pressure and having a vapor pressure of 417 millimeters of mercury at 100° C., separation of the reaction product from the reaction mixture by distillation is not feasible as the acid passes into the distillate in unacceptably large proportions. Acetic acid, too, is unsatisfactory in that it does not effect any substantial or acceptable degree of dehydration of the starting material, for instance, merely 9.5% of the starting material is dehydrated after heating with acetic acid for eleven hours.

According to the present invention, a process for the conversion of dimethylphenylcarbinol into monomeric α-methylstyrene with an excellent yield and without any appreciable formation of polymer, comprises heating the dimethylphenylcarbinol in the presence of catalytic quantities of an organic carboxylic acid that is substantially non-volatile and that has a dissociation constant of at least $1 \times 10^{-4}$ and at most $1 \times 10^{-2}$, measured at 25° C. According to a further aspect of the invention the said process is carried out in the presence of phenol.

The term substantially non-volatile is herein employed as an essential limitative qualification of the organic carboxylic acid catalyst and signifies that the acid is (1) substantially non-volatile under the dehydration reaction conditions, (2) less volatile than dimethylphenylcarbinol and capable of being separated from same by distillation, (3) less volatile than α-methylstyrene and capable of being separated from same by distillation and (4) capable of being substantially completely left in the residual reaction mixture following removal of α-methylstyrene therefrom by distillation. The boiling point of α-methylstyrene, at about atmospheric pressure, is 165°–170° C. and, at a pressure of 12 millimeters of mercury, it is about 55.4° C.

It has been found that these acid catalysts thus defined not only render it possible to effect dehydration of dimethylphenylcarbinol in the presence of phenol without the formation of cumylphenol, but surprisingly, the dehydration is even considerably accelerated in the presence of substantial proportions of phenol. This acceleration is quite unexpected because it has been stated in the literature that, in the absence of catalyst, the rate of the purely thermal dehydration of dimethylphenylcarbinol is inversely proportional to the quantity of phenol present.

The carboxylic acid catalysts as above defined that may be used satisfactorily in practice of the process of this invention include: hydroxy acids, such as lactic acid ($K=1.4 \times 10^{-4}$), citric acid ($K=8.4 \times 10^{-4}$), and tartaric acid ($K=9.7 \times 10^{-4}$); phenolic acids, such as salicylic acid ($K=1.06 \times 10^{-3}$); and aromatic di-acids, such as phthalic acid ($K=1.26 \times 10^{-3}$).

The aforesaid acids may be introduced into the medium as such, or in solution (e. g. aqueous solution), or may be formed in situ by reaction of their salts with a sufficient quantity of mineral acid to liberate the corresponding organic acid in the medium.

The process may be applied to the dimethylphenylcarbinol either alone or when mixed with phenol or other substances formed by decomposition of cumene hydroperoxide and at any stage of separation of the fission products.

For example, the dehydration may be carried out on the fission medium previously freed:

(a) From the products of lower boiling point than the dimethylphenylcarbinol, that is to say, acetone and any hydrocarbons present and the majority of the phenol and (b) From the products of higher boiling point, such as tars, etc. However, the dehydration may also be effected on the fission medium simply freed from the acid catalyst which has been used in the fission, before or after elimination of the acetone and of any hydrocarbons present.

The following examples will serve to illustrate the invention but are not to be regarded as limiting it in any way; the parts stated are by weight.

*Example I*

About 400 parts of dimethylphenylcarbinol, in a suitable distillation apparatus, and 8 parts of crystalline citric acid are heated at 145° C. under a pressure of 110 millimeters of mercury. In 3 hours and 40 minutes, 235 parts of a distillate containing 65% of monomeric α-methylstyrene are obtained, which corresponds to 46% dehydration of the starting material. No polymers are formed.

The improvement this process effects over prior art methods may be illustrated as follows: If the citric acid is replaced by the same quantity of sulphuric acid (66° Bé.) and otherwise the same conditions are used, the dimethylphenylcarbinol is completely dehydrated, but only 12.9% of monomeric α-methylstyrene is obtained, the remainder being polymerized.

*Example II*

A mixture of 200 parts of dimethylphenylcarbinol, 200 parts of phenol, and 4 parts of crystalline citric acid is heated at 134° C. under a pressure of 160 millimeters of mercury. In two hours, 205 parts of a distillate are collected containing 58% of α-methylstyrene, which corresponds to 70% dehydration of the starting material. No formation of polymers or of condensation products is observed.

Again to illustrate the improvement this process provides over prior art methods, if the citric acid is replaced by a commercial activated earth such as that marketed under the name "Clarsil," 87.2% of polymeric α-methylstyrene and 2.3% of cumyl phenol are obtained after heating at 102° C. for 15 minutes.

*Example III*

A mixture of 200 parts of dimethylphenylcarbinol and 200 parts of phenol is heated with 4 parts of phthalic acid in the form of a 2% aqueous solution. The temperature is maintained between 100° and 105° C. The α-methylstyrene distills off and is recovered. The heating is stopped after 7 hours when dehydration is substantially completed. Monomeric α-methylstyrene is obtained in a yield of 95%.

Analogous results are obtained with salicylic acid, tartaric acid and lactic acid, the α-methylstyrene yields fluctuating between 94% and 98%. In all cases, the formation of polymers and condensation products is negligible.

By way of contrast, two experiments hereinafter will be described wherein known catalysts are employed:

A mixture of 102 parts of dimethylphenylcarbinol and 106 parts of phenol is heated with 256 parts of 5% sulphuric acid. After 3 hours, a mixture of 7 parts of unconverted dimethylphenylcarbinol, 29.2 parts of monomeric α-methylstyrene, 48 parts of polymeric α-methylstyrene and 12 parts of cumylphenol is obtained.

Replacing the sulphuric acid in this experiment by an equivalent quantity of potassium bisulphate, 15 parts of unchanged dimethylphenylcarbinol, 50 parts of monomeric α-methylstyrene, 24 parts of polymeric α-methylstyrene and 2 parts of cumylphenol are obtained.

*Example IV*

A mixture consisting of 150 parts of dimethylphenylcarbinol and 1100 parts of phenol is heated with 2.5 parts of citric acid in the form of a 1% aqueous solution. The dehydration is complete in 5 hours and the monomeric α-methylstyrene yield is 98.5%. No cumylphenol is formed. Analogous results are obtained with lactic acid and with tartaric acid, the yields obtained being of the same order of magnitude.

By way of comparison, if the process is carried out under the same conditions in the presence of 250 parts of water containing no acid, only 3.75% of dimethylphenylcarbinol is dehydrated in 9 hours.

On the other hand, a large excess of phenol does not prevent the formation of polymers if the process is carried out in the presence of known catalysts. Thus, a mixture of 5 g. of dimethylphenylcarbinol, 90 g. of phenol and 5 g. of water containing 0.005 g. of sulphuric acid, when heated at 130° C., gives a mixture containing 30% of polymer.

*Example V*

A mixture consisting of 200 parts of dimethylphenylcarbinol, 200 parts of phenol, and 200 parts of a 2% solution of salicylic acid acid is heated at its boiling point. In 7 hours, 60% of the dimethylphenylcarbinol is dehydrated and dehydration is complete in 12 hours to yield the desired α-methylstyrene. No polymer is formed.

*Example VI*

About 1200 parts of a mixture containing 10% of dimethylphenylcarbinol, 60% of phenol and 30% of acetophenone is heated at 145° C. with 1 part of salicylic acid. In 30 minutes, 68% of dimethylphenylcarbinol is dehydrated; in 60 minutes, 80%; and in 5 hours 92% of the starting material is dehydrated to yield monomeric α-methylstyrene.

We claim:

1. A process for the conversion of dimethylphenylcarbinol into monomeric α-methylstyrene comprising heating dimethylphenylcarbinol in the presence of catalytic quantities of a substantially non-volatile organic carboxylic acid having an ionization constant of at least $1 \times 10^{-4}$ and at most $1 \times 10^{-2}$, measured at 25° C.

2. A process for the conversion of dimethylphenylcarbinol into monomeric α-methylstyrene comprising heating a mixture containing dimethylphenylcarbinol and phenol in the presence of catalytic quantities of a substantially non-volatile organic carboxylic acid having an ionization constant of at least $1 \times 10^{-4}$ and at most $1 \times 10^{-2}$, measured at 25° C.

3. A process for the conversion of dimethylphenylcarbinol into monomeric α-methylstyrene comprising heating dimethylphenylcarbinol in the presence of citric acid.

4. A process for the conversion of dimethylphenylcarbinol into monomeric α-methylstyrene comprising heating a mixture containing dimethylphenylcarbinol and phenol in the presence of phthalic acid.

5. A process for the conversion of dimethylphenylcarbinol into monomeric α-methylstyrene comprising heating a mixture containing dimethylphenylcarbinol and phenol in the presence of salicylic acid.

6. A process for the conversion of dimethylphenylcarbinol into monomeric α-methylstyrene comprising heating a reaction mixture obtained by the fission of cumene hydroperoxide, which mixture is substantially freed from mineral acid but contains both dimethylphenylcarbinol and phenol, in the presence of catalytic quantities of a substantially non-volatile organic carboxylic acid having an ionization constant of at least $1 \times 10^{-4}$ and at most $1 \times 10^{-2}$ measured at 25° C.

7. A process for the conversion of dimethylphenylcarbinol into monomeric α-methylstyrene comprising heating a reaction mixture obtained by the fission of cumene hydroperoxide, which mixture is substantially freed from mineral acid but contains both dimethylphenylcarbinol and phenol, in the presence of citric acid.

8. A process for the conversion of dimethylphenylcarbinol into monomeric α-methylstyrene comprising heating a reaction mixture obtained by the fission of cumene hydroperoxide, which mixture is substantially freed from mineral acid but contains both dimethylphenylcarbinol and phenol in the presence of phthalic acid.

9. A process for the conversion of dimethylphenylcarbinol into monomeric α-methylstyrene comprising heating a reaction mixture obtained by the fission of cumene hydroperoxide, which mixture is substantially freed from mineral acid but contains both dimethylphenylcarbinol and phenol in the presence of salicylic acid.

References Cited in the file of this patent

UNITED STATES PATENTS 2,728,795   Armstrong et al. _____ Dec. 27, 1955

OTHER REFERENCES

Faraday's Encyclopedia of Hydrocarbon Compounds, vol. C9, 1947, page 09019.00.12, preparation No. 12.

Faraday's Encyclopedia of Hydrocarbon Compounds, vol. C8, 1947, page 08005.00.11, preparation No. 12.